(12) United States Patent
Koch et al.

(10) Patent No.: US 9,951,561 B2
(45) Date of Patent: Apr. 24, 2018

(54) ROD SECTION AND ROD SECTION SYSTEM

(71) Applicant: TRACTO-TECHNIK GmbH & Co. KG, Lennestadt (DE)

(72) Inventors: Elmar Koch, Eslohe (DE); Martin Köper, Attendorn (DE); Thomas Schauerte, Lennestadt (DE); Stefan Maschke, Lennestadt (DE)

(73) Assignee: TRACTO-TECHNIK GMBH & CO. KG, Lennestadt (DE)

( * ) Notice: Subject to any disclaimer, the term of this patent is extended or adjusted under 35 U.S.C. 154(b) by 347 days.

(21) Appl. No.: 14/684,004

(22) Filed: Apr. 10, 2015

(65) Prior Publication Data

US 2015/0322729 A1 Nov. 12, 2015

(30) Foreign Application Priority Data

Apr. 25, 2014 (DE) .......................... 10 2014 005 892

(51) Int. Cl.
| | |
|---|---|
| *E21B 7/04* | (2006.01) |
| *E21B 17/042* | (2006.01) |
| *E21B 17/00* | (2006.01) |
| *E21B 17/02* | (2006.01) |

(52) U.S. Cl.
CPC ............ *E21B 7/046* (2013.01); *E21B 17/003* (2013.01); *E21B 17/028* (2013.01); *E21B 17/042* (2013.01)

(58) Field of Classification Search
CPC ...... E21B 17/003; E21B 17/028; E21B 7/046; H01R 13/2421; H01R 4/70; H04B 2203/5475
See application file for complete search history.

(56) References Cited

U.S. PATENT DOCUMENTS

| | | | | |
|---|---|---|---|---|
| 3,926,269 | A | * 12/1975 | Cullen | ....................... E21B 4/04 166/65.1 |
| 4,725,783 | A | * 2/1988 | Miyairi | .................. E21B 17/023 166/65.1 |
| 5,358,418 | A | * 10/1994 | Carmichael | ........... E21B 17/028 166/65.1 |
| 2002/0014334 | A1 | 2/2002 | Chau et al. | |
| 2008/0003894 | A1* | 1/2008 | Hall | ....................... E21B 17/028 439/824 |
| 2012/0111634 | A1 | 5/2012 | Schuaerte et al. | |

FOREIGN PATENT DOCUMENTS

| | | |
|---|---|---|
| DE | 25 45 692 B | 10/1977 |
| DE | 10 2010 019 514 A1 | 11/2011 |

* cited by examiner

*Primary Examiner* — George S Gray
(74) *Attorney, Agent, or Firm* — Howard IP Law Group, PC

(57) ABSTRACT

A rod section having an electrical conductor which is arranged such that it is centered at the end and has an insulating sleeve and is fixed in the rod section such that when the rod section is joined to a further rod section having a fixed conductor, both conductors are joined together in a forcibly guided manner and the join is sealed by the sleeve in a forcibly guided manner.

19 Claims, 1 Drawing Sheet

ROD SECTION AND ROD SECTION SYSTEM

CROSS REFERENCE TO RELATED APPLICATIONS

This application claims the benefit under 35 U.S.C. § 119(a) of German Patent Application No. 10 2014 005 892.1, filed Apr. 25, 2014, the entire disclosure of which is incorporated herein by reference in its entirety for all purposes.

FIELD OF THE INVENTION

The invention relates to a rod section having an electrical conductor arranged such that it is centered at the end, and to a rod section system having a rod section of this type. The rod section or the rod section system according to the invention can be used for earth boring by an auger device, in particular the rod section is a rod section used in the HDD ("Horizontal Directional Drilling") method.

BACKGROUND OF THE INVENTION

Typically in earth boring, a drill head on the top of a pipe which has interconnected rod sections is driven into the ground. A bentonite drilling fluid can be pumped to the drill head through the rod. The bentonite drilling fluid can issue through the drill head and can flush out drilling cuttings through an annular space formed around the rod. The bentonite drilling fluid can also be used to stabilize the drilling channel, to cool the drill head and can be used as a lubricant in addition to flushing out the drilling cuttings. The drill head can be flattened at the sides for direction control. When the drill head advances by rotating, it is possible to drill straight ahead. If the rotation of the drill head is suspended, the lateral flattening makes it possible to deviate from drilling straight ahead. In addition to a pushing drive, an optional hammer mechanism can be used, in particular to counteract poor conditions in the ground.

In earth boring, particularly when creating a pilot bore, a probe is introduced into the region of the drill head to locate the drill head and/or also to measure state variables such as temperature, pressure and the like. The signals from the probe can be transmitted wirelessly or by cable for location and/or in respect of the state variables. The probe can be powered by accumulators or batteries for transmission. Due to this type of power supply, the energy is restricted for wireless transmission, thereby resulting in a narrower transmission range and a short service life. To increase the transmission range, an external voltage source can be connected to operate the probe at a higher voltage. For this purpose, cables associated with the rod sections can be provided which can produce a conductive connection. The connection of the cables allows higher voltages, as a result of which the service life can also be prolonged.

For example, DE 10 2010 019 514 A1 discloses an auger device with a drill rod which has rod sections. Arranged inside a rod section is a segment of a conductor, the two ends of each segment having a contact element, via which an electrical connection of the two segments arranged in the rod sections is simultaneously achieved when two rod sections are screwed together, in that the front contact faces of the contact elements are pressed against each other. DE 10 2010 019 514 A1 states that while the segments of the electrical conductor are themselves insulated, an insulation of this type for the contact faces of the contact elements is not provided because these have to be interconnected in an electrically conductive manner. An electrical connection between a portion of the contact faces and for example the casing of the drill rod via the drilling fluid can result.

A disadvantage of this type of connection of the conductors guided in the rod sections is that it is necessary to control a voltage source such that, if there is an electrically conductive connection between the rod casing and the conductor due to the drilling fluid, the conductor does not function as an anode.

SUMMARY

An object of this invention is to provide a rod section or a rod section system by which it is possible, in a simplified manner, to connect an electrical conductor arranged in one rod section to a conductor in a further rod section.

This object is achieved by the subject-matter of the independent claims. Advantageous embodiments are claimed in the dependent claims and are disclosed in the following description of the invention.

The crux of the invention is to fix a conductor in a rod section such that said conductor can be joined together in a forcibly guided manner with a fixed conductor in a further rod section and, at the same time, the join can be sealed in a forcibly guided manner by an insulating sleeve provided on the conductor. The connection region of the conductors is insulated automatically in a forcibly guided manner when the rod sections are connected. Thus during normal drilling operation, the conductors which are in the rod sections can be joined together when the rod sections are connected without any time delays and the connection region can be electrically insulated. In particular, the forced guidance of the conductors can be restricted to a pure translatory movement relative to one another, a rotation in the longitudinal direction of the rod section substantially about the center axis thereof based on the end portion not being ruled out. The sleeve can also be restricted to a purely translatory relative movement, it being possible for the sleeve to be rotated substantially about the center axis thereof in the longitudinal direction of the rod section.

In particular, the invention relates to a rod section or to a rod section system for earth boring. The rod section according to the invention or the rod section system according to the invention is used in particular with an auger device, preferably in the field of HDD.

The term "auger device" is understood as meaning in particular any device which moves a rod consisting of rod sections in an existing channel or in a channel to be created in the ground in order to create or widen a bore, in particular a horizontal bore or to replace an existing bore by destroying it or not, for cleaning, to draw lines into existing pipes or into other long bodies, as well as all devices for construction works of underground driving procedures.

The term "horizontal drilling" within the meaning of the present invention includes in particular any type of substantially horizontal channels which already exist or are to be created in a body, in particular underground channels including ground bores, rock bores or underground cables as well as underground or overhead pipelines and sewage channels which can be produced, widened, destroyed, cut open or cleaned using an appropriate auger device.

The term "sleeve" includes a hose-shaped or tubular sealing element which can at least partly enclose a connection of two conductors. In particular, the term includes a tubular sealing element which can be arranged around a portion of the conductor and the longitudinal axis of the sealing element can substantially coincide with the longitudinal axis of the conductor. The sleeve can comprise a flexible material. One end of the tubular sealing element can be joined to the conductor. The other end can have an annular opening in the direction of a further rod section, in which opening an end of the conductor of the rod section is arranged.

The rod section is preferably configured to form the electrical connection with a drill bit and/or with a drive device so that a complete electrical connection can be provided from the drive device to the drill bit via the rod.

The sleeve preferably has a pressure relief valve so that when rod sections and the conductors fixed therein are joined together, a space which is initially sealed in an airtight manner by the sleeve can be depressurized. If a space enclosed by the sleeve is compressed and an excess pressure is produced, this excess pressure can immediately escape via the pressure relief valve. Thus, when there is excess pressure, air and disruptive amounts of drilling fluid between the sleeve and the conductors can be forced out, as a result of which the electrical insulation can be increased by the sleeve resting relatively closely on the conductors. An airtight and electrically insulating connection can be produced.

In a particularly preferred embodiment, the sleeve has a wall which is configured such that when the sleeve is sealed, the wall can be widened when there is an excess pressure and the width can be reduced by a restoring force after the excess pressure has been relieved. This can provide a particularly simple configuration of a relief of excess pressure.

A "conductor" within the meaning of the invention is arranged such that it is centered at the end in the rod section. The conductor can have differently configured portions. For the electrical connection, the conductor can have two different elements respectively at the ends which can be brought into engagement with one another accordingly. One element can be in the form of a pin and the other element can be in the form of a bushing which can be brought into engagement with one another.

In a preferred embodiment, the conductor is flexible at least in one portion in the sleeve so that the conductor can be compressed by the conductor in the further rod section to provide an engagement path along which the sleeve can be brought into engagement via the conductor of the further rod section. The conductor can thereby be "shortened" in the joining region with the other conductor so that the sleeve can be moved over the join.

In a preferred embodiment, the conductor is configured in the form of a spring at least in one portion in the sleeve, in particular it is configured in the form of a bushing. Consequently, it is particularly simple for the conductor of the further rod section to be able to pass into the region of the sleeve in which the spring-like end portion of the conductor is compressed, around which portion the sleeve is arranged and the conductor of the further rod section can pass into the sheathing region of the sleeve. The other end with which the spring-like end can engage is preferably configured as a pin.

In a preferred embodiment, at least portions of the conductor are surrounded by a glass fiber material. More preferably, the glass fiber material is also enclosed by a protective layer. As a result, a conductor which is adapted to the harsh conditions in the ground having an appropriate insulation can be used.

The rod section preferably has an end thread for screwing together with the further rod section. This measure can provide a particularly simple forced guidance in the longitudinal direction of the rod sections. Due to the forcibly guided screwing, the rod sections to be joined together move longitudinally relative to one another. When the rod sections are joined together, an electrical conductor which is arranged substantially centrally in the rod section is moved in a substantially translatory manner, apart from the inherent rotation about the longitudinal axis. Likewise, the sleeve arranged around the conductor can be moved in a translatory manner, apart from the inherent rotation about a longitudinal axis of the sleeve.

In a preferred embodiment, in a rod section system with a rod section according to the invention, the sleeve is configured such that it has a smaller diameter than an external diameter of a sealing portion in the further rod section which is arranged at the end portion of the conductor and which can be brought into engagement with the sleeve. Consequently, a particularly simple sealing system can be provided in the rod section system.

In a preferred embodiment, the conductor in the further rod section is configured in a pin-like manner at the end so that it is possible to revert to a simple configuration of the conductor at least at one end. The sealing portion can adjoin the pin-like end portion of the conductor or the sealing portion can surround the pin-like end portion of the conductor, being set back into the rod section.

The above description, like the following description of exemplary embodiments is not to be construed as relinquishing specific embodiments or features.

BRIEF DESCRIPTION OF DRAWINGS

In the following, the invention will be described in more detail with reference to an embodiment illustrated in the drawings, in which.

DETAILED DESCRIPTION

Figure 1:
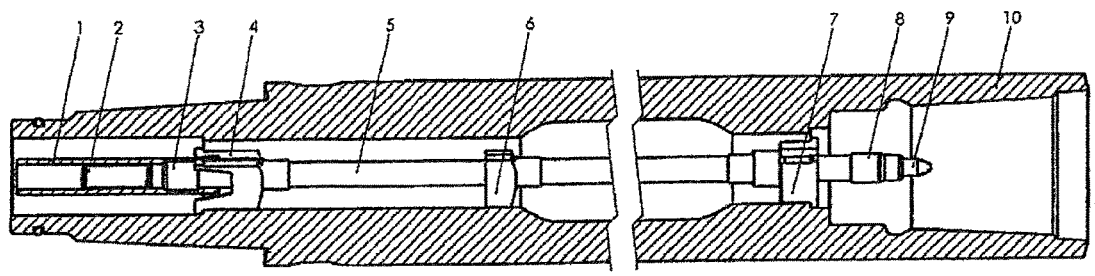
FIG. 1 is a sectional side view of a rod section according to the invention.
Figure 3:
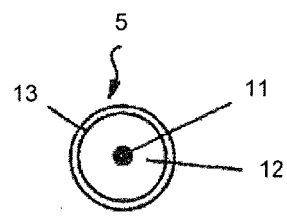
FIG. 3 is a front view of a conductor according to the invention.

FIG. 1 is a sectional side view of a rod section 10 according to the invention. A conductor 5 is arranged in a fixed manner in the rod section 10. The conductor 5 is centered inside the rod section 10 by spacers 4, 6 and 7. According to FIG. 3, the conductor 5 has an electrically conductive inner conductor 11. The inner conductor 11 is outwardly electrically insulated by a glass fiber material 12 and also by a protective layer 13. The protective layer 13 prevents quantities of water from a drilling fluid or other moisture from being able to penetrate the glass fiber material 12.

Located at the end of the rod section 10 are elements which produce an electrical connection between the inner conductors 11 of the conductors 5 in the rod sections 10 and/or a drill bit and/or a drive device and at the same time elements which electrically insulate the elements of the conductor 5 producing the connection so that there can be no short circuit between the conductor 5 and the rod section 10.

The electrical conductor 5 is configured at one end portion as a pin 9 which is electrically connected to the inner conductor 11. At the other end portion, the conductor 5 is configured as a bushing-like spring 2 to which a sleeve 1, surrounding the end portion of the conductor 5 with the spring 2 is arranged in a fixed manner. The spring 2 is connected in an electrically conductive manner to the inner conductor 11. The sleeve 1 protrudes in length over the end of the spring 2 in the direction of the end of the rod section 10. The sleeve 1 extends as far as a region of the conductor 5 which is insulated and is surrounded in particular by the glass fiber material 12 and the protective layer 13. In the embodiment shown, the sleeve 1 is configured as a tube which is arranged concentrically around the conductor 5 and is attached to the conductor 5 by a holding fixture 3.

The diameter of the spring 2 is slightly smaller than or is the same as the internal diameter of the sleeve 1 which consists of an electrically insulating and mechanically easily deformable material. The pin 9 as well as the sleeve 1 and the spring 2 are fixed centrally in the housing.

Figure 2:
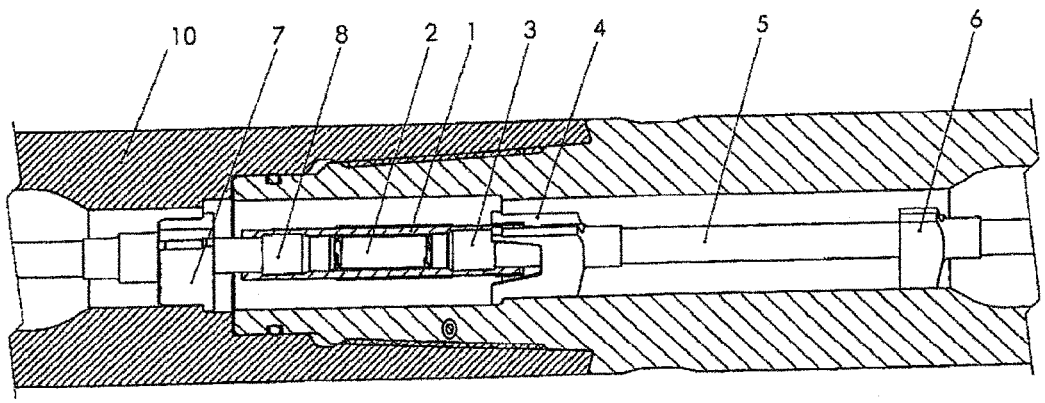
FIG. 2 is a sectional side view of a region of a rod in which two rod sections according to the invention have been joined together.

FIG. 2 is a sectional side view of two rod sections which have been screwed together. When the rod sections 10 are screwed together, the pin 9 and the sleeve 1 are moved towards one another in a forcibly guided manner. The pin 9 is threaded into the start of the sleeve 1. As the pin 9 and sleeve 1 continue to be moved towards one another, a sealing portion 8 which follows the pin 9 in the longitudinal direction and which is greater in external diameter than the internal diameter of the sleeve 1 engages with the sleeve 1. The pin 9 and sealing portion 8 are arranged concentrically to one another. During further movement, the rear volume space which is now decreasing in the sleeve 1 is compressed by the sealing portion 8. Excess pressure builds up which, during further compression, produces a pressure so that air and quantities of drilling fluid between the sleeve 1 and the pin 9 or the sealing portion 8 are forced out. In this respect, the sleeve 1 has such restoring forces that after the excess pressure has been relieved, the sleeve 1 is pressed onto the sealing portion 8 and onto the conductor 5. A mechanical seal and an electrical insulation is produced. Furthermore, a further sealing effect is produced by the drilling fluid inside the rod section 10 due to the mud pressure because the mud pressure acts from outside on the sleeve 1.

The invention claimed is:

1. A rod section comprising:
    a first electrical conductor arranged such that said first electrical conductor is centered at an end of said rod section;
    an insulating sleeve around said first electrical conductor, wherein said first electrical conductor is fixed in said rod section such that when the rod section is joined to a further rod section having a second electrical conductor, said first and second electrical conductors are joined together in a forcibly guided manner and the resulting join is sealed by said insulating sleeve in a forcibly guided manner,
    wherein said insulating sleeve comprises a length sufficient to receive at least a portion of said second electrical conductor in an area of the join.

2. A rod section according to claim 1, wherein the join is made to a drill bit or to a drive device, said second conductor arranged therein.

3. A rod section according to claim 1, wherein said insulating sleeve comprises a pressure relief valve for relieving pressure within said insulating sleeve.

4. A rod section according to claim 3, wherein said insulating sleeve has a wall configured such that when said insulating sleeve is sealed, the wall expands radially when there is a threshold pressure.

5. A rod section according to claim 1, wherein said first electrical conductor is flexible at least in one portion in the insulating sleeve.

6. A rod section according to claim 1, wherein said first electrical conductor is configured as a spring at least in one portion in the insulating sleeve.

7. A rod section according to claim 1, wherein portions of the first electrical conductor are surrounded by a glass fiber material.

8. A rod section according to claim 1, further comprising an end thread for screwing together with said further rod section.

9. A rod section according to claim 1, wherein said insulating sleeve has a smaller internal diameter than an external diameter of a sealing portion in said further rod section, and wherein said insulating sleeve is configured to receive said sealing portion as said first and second electrical conductors are joined together in the forcibly guided manner.

10. A rod section according to claim 1, wherein said second conductor in the further rod section is configured at one end as a pin.

11. An interconnecting rod section comprising:
    an elongate rigid housing having a first end and a second end;
    an electrical conductor disposed within said housing, said electrical conductor fixed within said housing such that said electrical conductor is centered at said first and second ends of said housing;
    a first connection element coupled to a first end of said electrical conductor;
    a second connection element configured to engage a first connection element of a further interconnecting rod section and coupled to a second end of said electrical conductor;
    said first connection element comprising:
        a flexible sleeve surrounding said electrical conductor at said electrical conductor's first end; and
        an electrically conductive compressible portion in electrical contact with said electrical conductor and disposed within said flexible sleeve;
    said second connection element comprising:
        a conductive pin configured to electrically engage a compressible portion of said further interconnecting rod section; and
        a sealing portion configured to follow said conductive pin when said conductive pin is inserted into said compressible portion of said further interconnecting rod section.

12. The interconnecting rod section of claim 11, further comprising:
    at least one spacer within said housing and in contact with said electrical conductor to fix said electrical conductor within said housing.

13. The interconnecting rod section of claim 11, wherein said electrical conductor comprises:
    a solid conductive conductor;
    a glass fiber material surrounding said solid conductive conductor; and
    a protective layer surrounding said glass fiber material.

14. The interconnecting rod section of claim 11, wherein said conductive pin is configured to electrically engage with an electrical element of at least one of a drill bit and a drive device.

15. The interconnecting rod section of claim 11, further comprising:
    a holding fixture configured to attach said flexible sleeve concentrically around said electrical conductor.

16. The interconnecting rod section of claim 11, said flexible sleeve having an internal diameter that is smaller than an external diameter of said sealing portion of said second connection element.

17. The interconnecting rod section of claim 16, further comprising:
   a pressure relief valve for selectively relieving pressure from within said flexible sleeve.

18. The interconnecting rod section of claim 11, further comprising:
   a threaded portion defined at one or more of said first end and said second end of said housing, configured to engage a second threaded portion of a further rod section.

19. The interconnecting rod section of claim 11, wherein the flexible sleeve is configured to extend over a join formed between the first connection element and a second connection element of a second further interconnecting rod section engaged with the first connection element.

* * * * *